United States Patent
Erbert

[15] 3,702,589
[45] Nov. 14, 1972

[54] BIMETALLIC TEMPERATURE SENSING DEVICE

[72] Inventor: Virgil Erbert, Albuquerque, N. Mex.

[73] Assignee: The United States of America as represented by the United States Atomic Energy Commission

[22] Filed: Feb. 8, 1968

[21] Appl. No.: 707,370

[52] U.S. Cl. .................................. 102/70, 73/378.3
[51] Int. Cl. .............................................. F42c 19/10
[58] Field of Search ...................... 73/378.3; 102/70

[56] References Cited

UNITED STATES PATENTS

| 1,656,392 | 1/1928 | Russell et al. | 73/378.3 X |
| 1,856,600 | 5/1932 | Thomas | 73/378.3 |
| 2,203,558 | 6/1940 | Wilson | 73/378.3 X |
| 2,487,789 | 11/1949 | Carr et al. | 102/70 |
| 2,565,145 | 8/1951 | Muffly | 73/378.3 X |
| 2,742,927 | 4/1956 | Frumet, Jr. | 73/378.3 X |

*Primary Examiner*—Verlin R. Pendegrass
*Attorney*—Roland A. Anderson

[57] ABSTRACT

A device for sensing temperature excursions beyond predetermined limits above and below the ambient temperature of the device or some associated equipment including a first bimetallic disc having a first stable curved configuration below a high temperature limit above ambient temperature and a second reversed, stable curved configuration above the high temperature limit, a second bimetallic disc convex with respect to the first disc in a first stable configuration above a low temperature limit below ambient temperature and having a second reversed, stable curved configuration below the low temperature limit with portions of the discs in constant engagement, and means for sensing any movement of either of the discs from their first to their second stable configurations.

9 Claims, 7 Drawing Figures

PATENTED NOV 14 1972 3,702,589

Virgil Erbert
*INVENTOR.*

3,702,589

BIMETALLIC TEMPERATURE SENSING DEVICE

BACKGROUND OF INVENTION

Many different types of temperature sensing devices have been used to monitor in a system or apparatus any excursions from normal operating or environmental temperatures or temperature ranges (that is, the ambient temperature for the system or apparatus). When such a system or apparatus is subjected to a large temperature excursion beyond some preset limit, it may be necessary to initiate some protective measure, (such as energizing a cooling or heating system), to destroy the system or apparatus, or to forcibly separate a system component from the system before any damage can be done by the temperature excursion. In many such applications it is desirable that the temperature sensing device be stable over the entire ambient temperature range and then activate at the precise temperature limit, that it be small, resetable and reliable, and that it operate without any external or supplementary power or energy source.

There are many applications in modern technology where systems or instruments may be subjected to extremely wide ranges of temperature excursions or fluctuations, such as in space where a representative ambient temperature range may be from near absolute zero to several hundred degrees from one side of a space craft to the other. There are also instances, such as with safe storage containers, where person attempting to enter the container may subject it to high and/or low temperature to open the container or defeat the locking or safing mechanism. Under these conditions, it may be desirable to sense both a high temperature limit above ambient as well as a low temperature limit below ambient using the same temperature sensing device without adding any additional components.

Further, it is desirable that the basic temperature sensing device be adaptable to provide with only minor modifications many different kinds of physical actuating or energizing signals, such as electrical or mechanical impulses, or direct ignition of pyrotechnics.

SUMMARY OF INVENTION

It is therefore an object of this invention to provide a new and improved temperature sensing device.

It is a further object of this invention to provide a temperature sensing device which is highly stable at all temperatures except at the desired temperature limits.

It is a further object of this invention to provide a temperature sensing device which is capable of sensing a high temperature limit above ambient and a low temperature limit below ambient.

It is a still further object of this invention to provide an automatically resetable temperature sensing device.

Various other objects and advantages will appear from the following description of one embodiment of the invention, and the most novel features will be particularly pointed out hereinafter in connection with the appended claims.

The invention comprises a temperature sensing device including first and second bimetallic elements outwardly curved with respect to each other with marginal portions in constant engagement, said elements adapted to snap to a reverse curvature, respectively, at a temperature above ambient and at a temperature below ambient and means for sensing any snap movement of either element.

DESCRIPTION OF DRAWINGS

Preferred embodiments of the present invention are shown in the accompanying drawings wherein.

DETAILED DESCRIPTION

Figure 1:
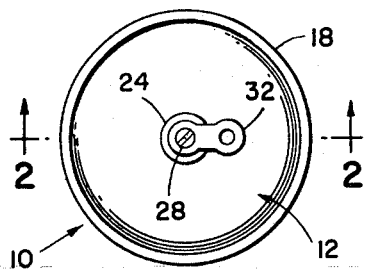
FIG. 1 is a plan view of one embodiment of a temperature sensing device constructed in accordance with this invention.
Figure 2:
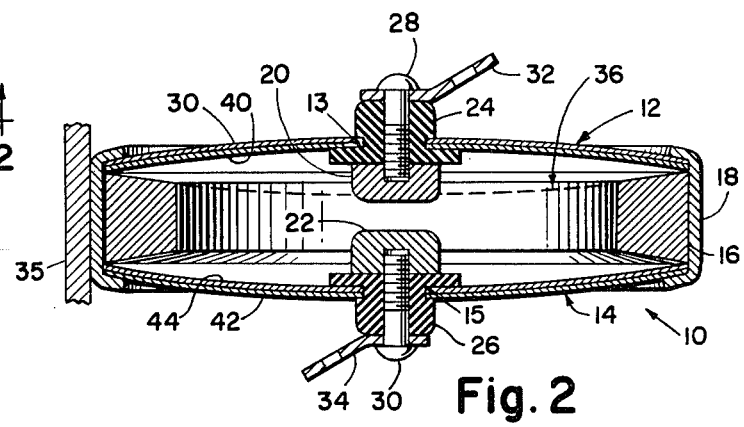
FIG. 2 is a cross-sectional view along line 2—2 of the device of FIG. 1.

Referring to FIGS. 1 and 2, there is shown a temperature sensing device 10 which may be used to monitor the temperature surrounding the device (under normal conditions the ambient temperature) and close an electrical circuit should the temperature go above a given high temperature limit above ambient or below a given low temperature limit below ambient. Device 10 may include a first dish-shaped or bowed bimetallic element or disc 12 separated from a second dish-shaped or bowed bimetallic element or disc 14 by a suitably formed annular standoff or spacer 16 around the marginal portions or portions or periphery of the discs. The discs may remain, as will be explained more fully below, convexly curved with respect to each other, as shown, at ambient temperatures. The peripheries of discs 12 and 14 may be maintained at all temperatures in substantial engagement through standoff 16 by an annular, channel clamp or restraint 18. Suitable electrical contacts 20 and 22 may be mounted or fastened on each disc 12 and 14 through openings 13 and 15 in axial alignment by grommets 24 and 26 and mounting screws 28 and 30. Contacts 20 and 22 may be connected to some electrical circuit or utilization device (not shown) through screws 28 and 30 and electrical terminals 32 and 34.

Device 10 may be fixably mounted through either the terminal 32 or 34 or by clamp 18 to any convenient support 35. It should be noted that for effective operation of the temperature sensing device, the device should not be fixably mounted through more than one of these points.

Figure 2A:
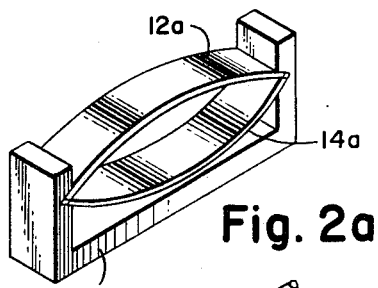
FIG. 2a is a perspective view of bowed bimetallic strips which may be used in the device of FIGS. 1 and 2.

Bimetallic elements 12 and 14 may be made from any commercially available bimetal or bimorph laminates having the desired combination of coefficients of thermal expansion for each layer of the laminate. Typical laminates may curve or bend at temperatures from below about −100° F. to above about 1,000° F. The laminate may be cut out in a disc, as shown in FIGS. 1 and 2, having desired dimensions and the disc pressed into a bowed or dished configuration having some predetermined radius of curvature. The laminate may also be cut out in some other suitable shape, such as strip or rectangles 12a and 14a held by rigid restraint 18a as shown in FIG. 2a, and the strip pressed into a bowed or dished configuration. A suitably formed, bowed, metallic element will have two stable, oppositely facing positions of concavity above and below some critical temperature. The element may snap from one configuration to the other whenever the temperature of the disc reaches and goes beyond the critical temperature. The critical temperature of a particular element may be a function of the radius of curvature of the elements (height of bowing or dishing), the thickness of the bimetal laminate and the relative coefficients of expansion of the laminate layers.

In device 10, bimetallic element 12 may snap from the stable, ambient temperature dished configuration shown in FIG. 2 to an oppositely facing position, as shown by the dotted lines 36, at some critical or predetermined high temperature limit above ambient by making layer 38 of a material having a lower coefficient of thermal expansion than layer 40 and selecting the proper combination of variables noted above. Likewise, bimetallic element 14 may snap from the stable, ambient temperature dished configuration shown in FIG. 2 to an oppositely facing position at some critical or predetermined low temperature limit below ambient by making layer 42 of a material having higher coefficient of thermal expansion than layer 44 and, again, selecting the proper combination of variables noted above. It will be apparent that when device 10 senses either the high or low temperature limits as represented by the preset critical temperatures of elements 12 and 14, contacts 20 and 22 may close and complete or short out some external circuit through terminals 32 and 34 to effect some indication, actuate an alarm or energize some device in the utilization device. The cross-sectional dimensions of standoff 16 may be selected to effect some desired spacing between contacts 20 and 22 at ambient temperature, or eliminated entirely, to prevent arcing depending on the voltage between the contacts.

Dished or bowed bimetallic elements generally may gradually increase their radius of curvature as the temperature of the disc approaches the critical temperature, and correspondingly gradually decrease their radius of curvature as the temperature recedes from the critical temperature. Such movement may thus change the spacing between contacts 20 and 22 and may limit the voltage which may be held off across the contacts. However, since the critical temperatures of elements 12 and 14 are above and below ambient temperature, one of the elements may be increasing and the other decreasing in radius of curvature for all temperature changes. Thus, the changes in curvature may be substantially compensated for and the contact spacing maintained relatively constant.

Figure 3:
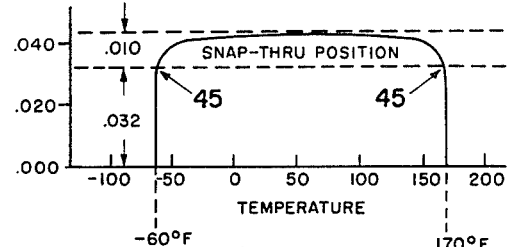
FIG. 3 is a plot of electrode spacing vs. temperature for the device of FIGS. 1 and 2.

A plot of electrode spacing vs. temperature for a temperature sensing device 10 is shown in FIG. 3 where the critical temperatures for elements 12 and 14 were about 170° F. and —60° F. respectively. As can be seen, the contact spacing may be maintained substantially constant over a wide range of ambient temperatures until the point of snap through as indicated as points 45. At the points of snap through, there is a step change in curvature and contact spacing. The portion of the plot just before points 45 may be compensated for by providing additional initial spacing between the electrodes. When the temperature of the elements recedes to ambient the elements return to their ambient dished or bowed configuration shown in FIG. 2.

The energy content of the bimetallic disc when snapping from one stable curvature configuration to the other is directly dependent on the mass (or volumn) of the elements. Thus, this energy may be used, if made sufficiently large, to initiate directly a pyrotechnic. In the temperature sensitive device shown in FIG. 4, the single, dished or bowed bimetallic elements may be replaced by a plurality of dished bimetallic discs nested into coacting groups or units 46 and 48. Each disc in the nested units may be formed so as to be sensitive to the same critical temperature so that all of discs of a unit reverse curvature at the same time. The combined energy developed by the change in curvature of the discs in one unit may be used to impinge a firing pin mechanism 50 mounted by suitable fastening means 52 on unit 46 against a percussion-type pyrotechnic cap 54 mounted by suitable fastening means 56 on unit 48. Pyrotechnic 54 may in turn ignite a detonating fuse or train 58 passing through means 50 adjacent the pyrotechnic to initiate some protective mechanism or device (not shown). The compensating feature of the opposing discs, as described with respect to FIG. 3, may permit the firing pin or percussion cap to attain sufficient and constant energy to be ignited by maintaining the spacing therebetween at a constant until a critical temperature is reached.

Figure 4:
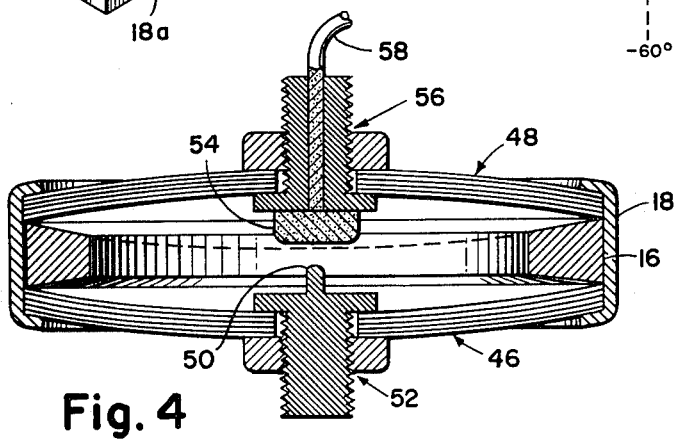
FIG. 4 is a cross-sectional view of another embodiment of this invention.
Figure 5:
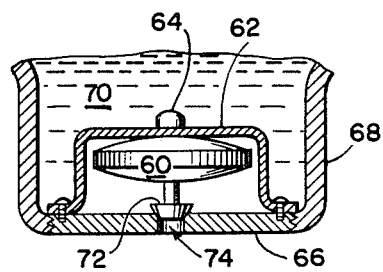
FIG. 5 is a view partially in cross section of a further embodiment of this invention.

The movement of the bimetallic discs in a temperature sensing device of the type shown in FIGS. 2 and 4 may also be used to initiate some kind of mechanical indication or actuation when the temperature goes beyond a critical temperature. Referring to FIG. 5, a temperature sensing device 60 may include a pair of oppositely facing dished, bimetallic discs or units as described previously. One of the discs or units may be fixably mounted on or fastened to a U-shaped bracket 62 by s suitable fastener 64, as shown. Bracket 62 may be mounted on any convenient stand or platform depending on the particular application of the device, in this illustration a threaded plug 66. Plug 66 may be threaded into the opening of a bottle or container 68 filled with some critical fluid or gas 70. A valve 72 may be fixably mounted to the other disc of device 60, or the disc itself may be used as a valve, and seated over an opening or passageway 74 in plug 66. If fluid 70 reaches a temperature beyond either of the critical temperatures of the device 60, one of the discs may reverse curvature removing valve 72 from its seat and permitting the egress of fluid 70 through passageway 74. Plug 66 may also be mounted outside container 68 by merely reversing the plug to permit device 60 to monitor temperature outside the container and release fluid 70 accordingly. The compensating feature of the opposing discs, as described with respect to FIG. 3, may permit the valve to remain seated until a critical temperature is reached.

Figure 6:
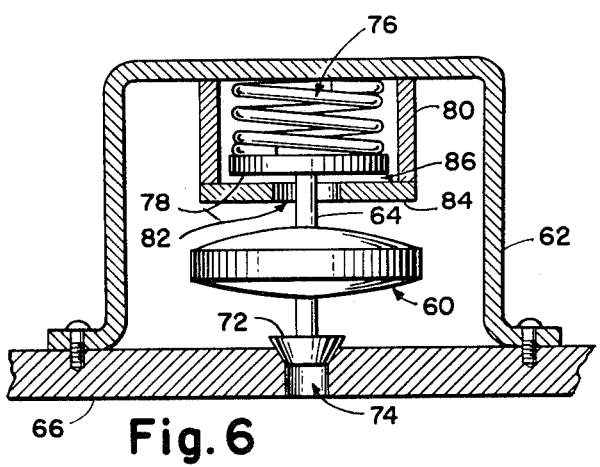
FIG. 6 is a fragmentary view of a modification of the embodiment shown in FIG. 5.

There may be applications where the change in curvature of the discs immediately before reaching the critical temperature (just before points 45 in FIG. 3) may permit a loosening of the valve seat and consequently a premature release of fluid 70 from container 68. The device of FIG. 5 may be modified to compensate for even this slight change in curvature by mounting a resilient member or spring biasing means 76 between the device 60 and bracket 62, as shown in FIG. 6. Spring 76 may be compressed between bracket 62 and a piston or plate 78 which may be fixably fastened to device 60 by fastener 64. Spring 76 and piston 78 may be loosely supported within a cylinder 80 to laterally support the spring and piston while permitting longitudinal movement thereof. Cylinder 80 may be suitably mounted on bracket 62 and aligned with device 60 so that fastener 64 passes through a reduced diameter opening 82 in the end of the cylinder. The size of opening 82 may be selected so that fastener 64 passes readily through without restriction while blocking the passage of piston 78 against end stop 84. The spring force of spring 76 may be chosen so as to maintain the pressure between valve 72 and its seat over opening 74 during the change in curvature of the device up to the step change at point 45 of FIG. 3. The length of spring 76 may be selected so as to provide a given space 86 between piston 78 and the stop 84, slightly greater than the maximum change in curvature of the device between points 45 of FIG. 3. Thus, as the ambient temperature approaches a critical temperature, spring 76 maintains the pressure between the valve and its seat, but, when the critical temperature is reached and the step change in disc curvature results, stop 84 prevents the further biasing of device 60 by the spring and permits the removal of the valve from its seat.

A temperature sensing device made in accordance with this invention may be used in a wide range of applications to initiate some desired response when the temperature reaches either a high or low temperature limit either above or below ambient. The oppositely disposed bimetallic discs or units provide a unique compensating function over a wide range of temperatures to insure an abrupt, step response when a critical temperature is reached. This step response may be used to directly initiate either an electrical, mechanical or pyrotechnic signal without modifying the basic mechanism.

It will be understood that various changes in the details, materials and arrangements of the parts, which have been herein described and illustrated in order to explain the nature of the invention, may be made by those skilled in the art within the principles and scope of the invention as expressed in the appended claims.

What is claimed is:

1. A device for sensing temperature excursions above and below an ambient temperature, comprising a first bowed bimetallic member adapted to snap to a reverse bowed configuration at a first temperature above ambient temperature, a second bowed bimetallic member normally bowed away from said first bimetallic member and adapted to snap to a reverse bowed configuration at a second temperature below ambient temperature, means for maintaining marginal portions of said bimetallic members in an initial relationship of one with respect to the other and means for sensing snap movement of either of said bimetallic members.

2. The device of claim 1 wherein said bimetallic members are dished discs.

3. The device of claim 1 having at least one bimetallic member nested with said first and said second bimetallic members.

4. The device of claim 1 wherein said sensing means includes a first means mounted internally of said first member and a second means mounted internally of said second member and aligned with said first means.

5. The device of claim 4 wherein said first and second means are electrodes.

6. The device of claim 4 wherein said first means is a firing pin and said second means is a percussion ignitable pyrotechnic.

7. The device of claim 1 wherein said sensing means is mounted externally of one of said members.

8. The device of claim 7 wherein said sensing means is a valve.

9. The device of claim 1 having an annular standoff between peripheries of said members to maintain the members at a predetermined initial spacing.

* * * * *